United States Patent [19]

Threlkeld et al.

[11] 4,120,361

[45] Oct. 17, 1978

[54] METHOD FOR REDUCING THE PERMEABILITY OF SUBTERRANEAN FORMATIONS TO BRINES

[75] Inventors: Curtis B. Threlkeld; James E. Hessert; Richard L. Clampitt, all of Bartlesville, Okla.

[73] Assignee: Phillips Petroleum Company, Bartlesville, Okla.

[21] Appl. No.: 612,514

[22] Filed: Sep. 11, 1975

Related U.S. Application Data

[60] Division of Ser. No. 462,325, Apr. 19, 1974, Pat. No. 3,949,811, which is a continuation-in-part of Ser. No. 353,452, Apr. 23, 1973, abandoned, and Ser. No. 359,722, May 14, 1973, abandoned, said Ser. No. 353,452, Continuation-in-part of Ser. No. 193,338, said Ser. No. 359,722, Continuation-in-part of Ser. No. 184,784.

[51] Int. Cl.$^2$ .................... E21B 33/138; E21B 43/22; E21B 43/25

[52] U.S. Cl. ................................ 166/294; 166/270; 166/295; 166/305 R

[58] Field of Search ............... 166/295, 294, 270, 271, 166/281, 273–275, 300, 305 R

[56] References Cited

U.S. PATENT DOCUMENTS

| 3,306,870 | 2/1967 | Eilers et al. | 166/295 X |
|---|---|---|---|
| 3,308,885 | 3/1967 | Sandiford | 166/295 |
| 3,396,790 | 8/1968 | Eaton | 166/293 X |
| 3,658,129 | 4/1972 | Lanning et al. | 166/294 X |
| 3,687,200 | 8/1972 | Routson | 166/295 X |
| 3,741,307 | 6/1973 | Sandiford et al. | 166/300 X |
| 3,757,863 | 9/1973 | Clampitt | 166/270 X |
| 3,762,476 | 10/1973 | Gall | 166/294 |

Primary Examiner—Stephen J. Novosad

[57] ABSTRACT

A method for reducing the quantity of water produced from a well bore-penetrated subterranean formation and for increasing the production rate of fluid hydrocarbons produced from said formation. Said method comprises injecting into said formation an aqueous solution of a partially hydrolyzed polyacrylamide, and contacting said polyacrylamide in situ with an aqueous solution containing divalent and/or trivalent metal cations.

7 Claims, 3 Drawing Figures

METHOD FOR REDUCING THE PERMEABILITY OF SUBTERRANEAN FORMATIONS TO BRINES

This application is a division of copending application Ser. No. 462,325 filed Apr. 19, 1974, now U.S. Pat. No. 3,949,811, which is a combined continuation-in-part of then copending application Ser. No. 353,452, filed Apr. 23, 1973 (now abandoned), and also then copending application Ser. No. 359,722, filed May 14, 1973 (now abandoned); said application Ser. No. 353,452 was in turn a continuation-in-part of then copending application Ser. No. 193,338, filed Oct. 28, 1971, now abandoned; and said application Ser. No. 359,722 was in turn a continuation-in-part of then copending application Ser. No. 184,784, filed Sept. 29, 1971, now abandoned.

This invention relates to an improved method for producing hydrocarbons from subterranean formations. In one aspect this invention relates to a method for reducing the permeability and porosity of subterranean formations to brines thereby promoting better control of fluid injection patterns and the secondary recovery of hydrocarbons. In another aspect this invention relates to a method for reducing the quantity of water recovered from a subterranean formation penetrated by a well bore and for increasing the production rate of fluid hydrocarbons. In another aspect this invention relates to prolonging mobility control and/or plugging of a subterranean formation through the application of aqueous solutions comprised of at least two distinguishable thickening agents.

The art is well aware that the production of large amounts of water from oil wells and gas wells constitutes one of the major items of expense in the overall recovery of hydrocarbons therefrom. Many oil wells will produce a gross effluent comprising greater than 80 percent by volume of water. Most of the pumping energy is therefore expended in lifting water from the well, and thereafter the production effluent must be put through expensive separation procedures in order to recover waterfree hydrocarbons. The remaining water constitutes a troublesome and expensive disposal problem. It is therefore highly desirable to decrease the volume of water produced from oil wells and gas wells. By decreasing the flow of water into the well bore, another beneficial effect is obtained in that, at a given pumping rate, there will be a lower liquid level over the pump in the well bore, thus reducing back pressure in the formation and improving pumping efficiency and net daily oil production.

Brine or other undesired water recovered from well bore penetrated subterranean formations can result from the infiltration of naturally-occurring subterranean water or, in the case of waterflood projects, from injection brines of water. Either source of brine or water leads to lowered efficiency in producing the desired hydrocarbons from the formation. In the application of water-flooding to hydrocarbon reservoirs, poor sweep efficiency often leads to disappointing results. Solutions of water thickeners have been developed, for example, aqueous solutions or dispersions of high molecular weight polymers which improve results. However, some solutions are expensive and sometimes do not yield effective reduction of permeability of desired permanence. Solutions can be prepared, using fresh water or brines of various compositions, preferably the same brine as that used following the first polymer solution.

It is another object of this invention to provide a method for reducing subterranean formation permeability to brines. It is another object of this invention to provide a method for effectively reducing the subterranean formation permeability with a minimum amount of thickened water solutions. It is another object of the invention to provide a method for reducing the quantity of water produced from a well bore-penetrated, subterranean formation. It is a further object of this invention to provide a method of prolonging mobility control and/or plugging of at least portions of a subterranean formation through the application of aqueous solutions of at least two viscosity increasing agents.

The method of the invention can be used for water diversion purposes in either injection wells of waterfloods or hydrocarbon production wells for the purpose of reducing the water-oil ratio produced therefrom, e.g., reduce the mobility of water in the well bore area. Preferably, the invention relates to a one-time treatment wherein the treatment will last for several days or months, thereby reducing the long term amount of additive required as water thickeners.

The method of this invention provides a prolonged high residual resistance factor through the application of an aqueous polymer solution interspaced with a brine slug which results in an in situ viscosity increase or thickening of the polymer solution. The results achieved by applying the method of the invention are a residual resistance factor greater than that produced by uninterrupted aqueous polymer solution treatments in waterflood, plugged or well workover operations. For the purposes of this invention, residual resistance factor will be defined as the mobility of brine before treatment divided by the mobility of brine after treatment, and resistance factor will be defined as the mobility of brine before treatment, divided by the mobility of the treatment solution. Resistance factor is of interest during injection while residual resistance factor demonstrates the final results after injection applications have ceased.

In the application of waterflooding projects, the extent of the water diversion depends upon the magnitude of the residual resistance factor wherein the higher the residual resistance factor, the more the water is diverted from high permeability zones into lower permeability zones. The duration of the water diversion depends upon the duration of a high value residual resistance factor. The increased residual resistance factor will increase the degree of water diversion as long as the factor is maintained, thereby determining the duration of the water diversion.

In the application of oil producing wells, the magnitude of the decrease in the producing water-to-hydrocarbon ratio depends upon the magnitude of the residual resistance factor. The duration of the decreased water-to-hydrocarbon ratio depends upon the duration of the high value of residual resistance factor. The method and materials used to carry out the invention can also be applied to workovers of producing wells. Workover fluids are generally fresh water based muds with additives to give viscosity, water loss, lubricity and other desirable characteristics.

In the application of aqueous polymer solution thickeners, particularly partially hydrolyzed polyacrylamides, the behavior of the polymer determines the residual resistance factor which is sustained during elution of the porous media with brine. The heretofore utilized residual resistance factor usually obtained by application of partially hydrolyzed polyacrylamides in sandstone, for example, having intermediate permeability (100 to 1000 m.d. to air) ranges from about 2 to about 6, depending upon the sandstone characteristics and the particular polyacrylamide and brine used. The method of the invention has developed a method for obtaining a greatly improved residual resistance factor through the application of an aqueous polymer solution comprised of partially hydrolyzed polyacrylamide wherein the aqueous polymer solution application is interspaced with a brine slug. A standstone was contacted with a polymer solution containing 1500 ppm polyacrylamide, followed by contacting with in excess of 1000 pore volumes of brine having multivalent cations and then again contacted with the polymer solution. Upon further elution with brine, the sustained residual resistance factor was found to have been increased by a factor in excess of 2.5 over the residual resistance factor obtained without the brine interspacing slug.

Several different viscosity increasing agents can be used according to the method of the invention, for example, polyacrylamides, and partially hydrolyzed polyacrylamides,, and the like. Each slug can be of like or different viscosity increasing agents. A preferred embodiment utilizes a partially hydrolyzed polyacrylamide having up to about 70 percent of the amide groups thereof hydrolyzed to carboxyl groups. The partially hydrolyzed polyacrylamide preferably has a molecular weight in excess of $1.0 \times 10^6$ and can be used in producing an aqueous polymer solution slug comprising from about 25 to about 50,000 ppm of the thickener, preferably from 500 to 10,000 ppm in brine, more preferably from about 500 to about 3,000 ppm of the polymer. Tables I and II hereinafter demonstrate that partially hydrolyzed polyacrylamides having a degree of hydrolysis within the range of 15 to 21 percent are particularly useful in the practice of the invention.

The aqueous polymer solution is introduced into the subterranean formation through a penetrating well bore. The method of the invention interspaces these slugs of polymer solutions with slugs of brine. Interspacing the polymer solution slugs with brine reduces the formation permeability.

A well can be treated according to the method of the invention with polymer solution slugs of a volume in the range of from about 1000 to about 3000 barrels, for example. The treatment solutions can have a polymer concentration of from about 25 to about 50,000 ppm depending upon the viscosity desired. Inert materials such as ground walnut hulls, asbestos, leather, etc., can be used to the polymer solutions and act as filler or backbone for a filter cake producing thereby low water loss.

The invention comprises injecting into a subterranean formation through a well bore a first aqueous solution, a brine slug, a second aqueous solution, terminating the injection of the second aqueous solution, and recovering hydrocarbon fluids from the subterranean formation. In one embodiment of the invention the first aqueous solution comprises about 25 to about 50,000 ppm of a partially hydrolyzed polyacrylamide preferably having a molecular weight in excess of $1.0 \times 10^6$ and having in the range of about 11 to about 70 percent, preferably 11–40 percent, more preferably 15–25 percent, of the amide groups hydrolyzed to carboxyl groups. The second aqueous solution comprises about 25 to about 50,000 ppm of a partially hydrolyzed polyacrylamide preferably having a molecular weight in excess of $1.0 \times 10^6$ and having in the range of from about 3 to about 13 percent, preferably 5–13 percent, of the amide groups hydrolyzed to carboxyl groups and said percent hydrolysis being less than the percent hydrolysis of the polymer in the first aqueous solution. It is preferred that the degree of hydrolysis of the polymers used in the two steps should differ by at least 5 weight percent. The first and second aqueous polymer slugs according to this embodiment of the invention are distinguishable by the percentage of hydrolyzed amide groups of the polymer with said first polymer having a larger percent hydrolysis than said second polymer. The degree of hydrolysis of the amide groups contained in the polyacrylamide determines the sensitivity of the solution to brine. Brine can be used as the intermediate slug and as the aqueous carrier for the polymer solutions, provided no precipitation of the polymer occurs. Preferably fresh water is used as the carrier for the first polymer slug and brine as the carrier for the second polymer slug. The brine can have a solids content in the range of about 85,000 to about 200,000 ppm.

Thus, in one preferred embodiment the invention utilizes two distinguishable slugs of polymer solution in a specific order with the polymer slugs being separated by a brine spacer slug which produces a residual resistance factor substantially higher than the residual resistance factors produced by a slug of either polymer alone. The first polymer solution is sensitive and incompatible with the intermediate brine spacer slug or the brine in which the second polymer is mixed. Sensitivity and incompatability, as defined herein, mean that when the polymer solution is mixed with the brine, the polymer will precipitate to a large extent, or the polymer solution will become turbid. The second polymer solution is relatively insensitive to the brine being employed and when admixed therewith the polymer does not precipitate.

The residual resistance factors can be enhanced by incorporating compounds which will produce divalent and trivalent cations, i.e., 50 to 25,000 ppm $Ca++$, $Mg++$, $Ba++$, $Al+++$, $Fe+++$, $Ti ++++$, $Zn++$, $Sn++++$ or $Cr+++$, in the intermediate brine spacer slug. The fingering and backflow of these cations in the intermediate brine slug through the initial and final polymer slugs produces larger water diversion effects than single polymer applications. The use of brine spacer slugs containing the divalent and trivalent cations has produced high residual resistance factors. Said multivalent cations promote the viscosity increase of the polymer solution slugs. Normally, brine slugs contain $Ca++$ and $Mg++$ divalent cations which will cause some crosslinking of the partially hydrolyzed polyacrylamide polymers. The brine slugs can vary in dissolved solid content of up to about 200,000 ppm and can constitute up to several thousand barrels in volume. A preferred brine would contain $Ca++$ and $Mg++$ cations as exemplified in the analyzed simulated sea water as found in footnote 1 of Table I below.

Concentration ranges of the multivalent ions in the brine slug can be

| | |
|---|---|
| $Ca^{2+}$ | 400–90,000 ppm, preferably 400–40,000 ppm |
| $Al^{3+}$ | 1–50,000 ppm, preferably 1–500 ppm |
| $Mg^{2+}$ | 500–90,000 ppm, preferably 1,000–50,000 ppm |

The outstanding residual resistance factor achieved through the method of the invention results from the sequential steps of: introducing into a subterranean formation (a) a first polymer solution, (b) a brine slug having multivalent ions, and (c) a second slug of polymer solution. The sequence of steps (a), (b), and (c) can be repeated. The polymer slug can be made by adding the polymer to simulated sea water.

FIG. 1 is a graph showing a plot of resistance actor vs volume of fluid injected in a process wherein first hard brine was injected into a core, then a hard brine solution containing 3,000 ppm of 11 percent hydrolyzed polyacrylamide was injected into the core, and then additional hard brine was injected into the core.

Figure 2:
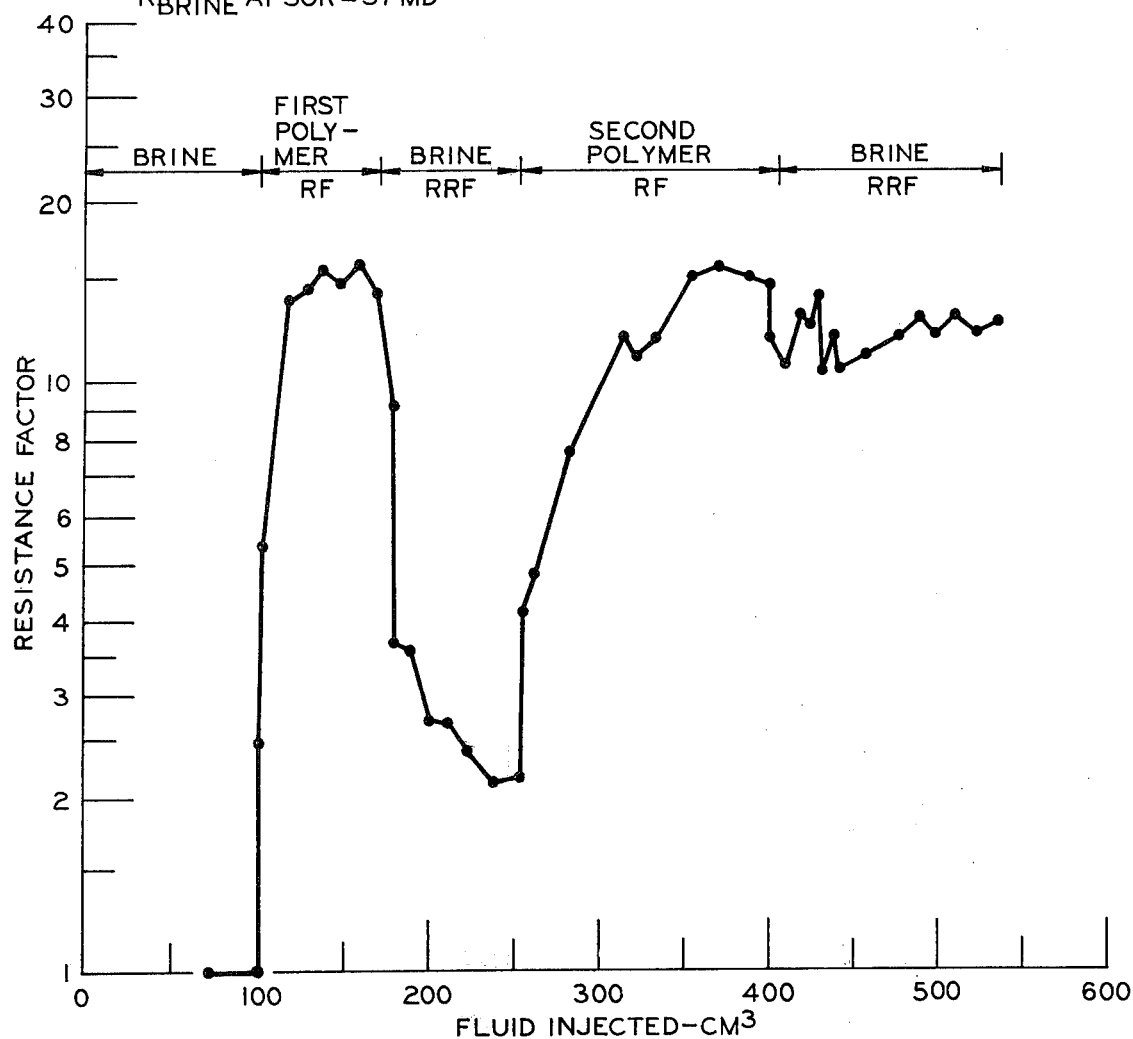

FIG. 2 is a graph showing a plot of resistance factor vs volume of fluid injected in a process wherein first hard brine was injected into a core, then a fresh water solution containing 3,000 ppm of 19 percent hydrolyzed polyacrylamide was injected into the core, then additional hard brine was injected into the core, then a hard brine solution containing 3,000 ppm of 11 percent hydrolyzed polyacrylamide was injected, and then additional hard brine was injected.

Figure 3:
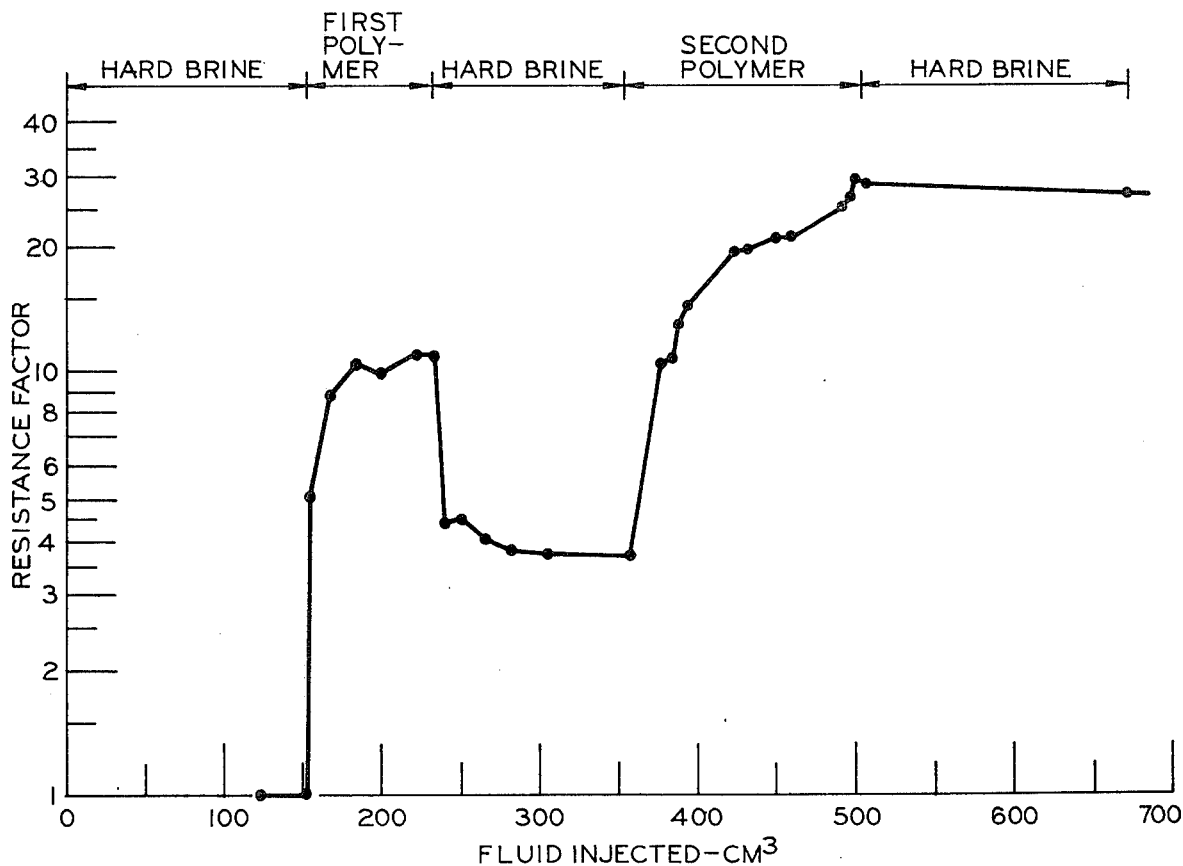

FIG. 3 is a graph showing a plot of resistance factor vs volume of fluid injected in a process wherein first hard brine was injected into a core, then a fresh water solution containing 3,000 ppm of 19 percent hydrolyzed polyacrylamide was injected into the core, then additional hard brine was injected into the core, then a hard brine solution containing 3,000 ppm of 11 percent hydrolyzed polyacrylamide was injected into the core, and then additional hard brine was injected.

Following the injection of the second aqueous solution into the formation, the well can be placed back on production under the conditions that were employed prior to the treatment. A substantial reduction in the waterhydrocarbon ratio of the well effluent is achieved due primarily to a reduced flow rate of water into the well bore. Although the immediate effect of the method of this invention is to decrease the quantity of water recovered from a well bore-penetrated subterranean formation, a secondary effect is increasing the absolute daily production rate of hydrocarbons owing to the reduced back pressure on the formation.

Polymeric waterflood additives can increase oil recovery from petroleum reservoirs by diverting water to unswept areas of the reservoir, by reducing water influx into producing wells and by increasing the mobility ratio of the oil to the driving fluid. The data included in the following tables illustrate the results when the method of the invention is applied as compared to known methods. Tables I, II, and III, below, demonstrate application of the method of the invention and the superior results achieved thereby. Table I illustrates a sometimes preferred embodiment of the invention wherein the same polymer is used in both polymer solution slugs. Table II defines the polymers used in the two aqueous polymer solutions of Tables I and III. Table I illustrates the results achieved by interspacing a first and second polymer solution slug with brine and the resulting residual resistance factor as compared to the same factor when using only one polymer solution slug. Table III illustrates a modification of the inventive method wherein additional multivalent ions discussed above are added to the interspacing brine which is injected between consecutive polymer solution slugs with the polymer utilized being polymer #1 to Table II.

The results as illustrated in the following tables were achieved through the utilization of 1-inch diameter cores drilled from "G" zone Carpinteria cores. The cores were extracted with toluene, dried in a vacuum oven and then measured for air permeability. The core porosities were also determined through suitable means before th core was waterflooded and the specific permeability to simulated sea water measured. The cores were then oil flooded with a refined oil having a viscosity of about 23 centipoises at 77° F. The cores were then waterflooded with brine and the permeability of the core to the brine was measured under residual oil saturation conditions. The permeability established thereby was used as a base to measure the residual resistance factor (RRF) after treatment of the cores by the method of this invention.

In Tables I and II the polymers used in the polymer slugs were at a concentration of 1500 ppm in simulated sea water as the brine.

TABLE I

| Cores | Treating Solution | Permeability To Air (m.d.) | Stabilized Residual Resistance Factor to Simulated Sea Water |
|---|---|---|---|
| 1 | Polymer #1 of Table II (1500 ppm) | 260 | 2.9 |
| 2 | Polymer #1 of Table II (1500 ppm) | 405 | 2.9 |
| 2(a) | a. Polymer #1 (1500 ppm) b. Brine(1) c. Polymer #1 (1500 ppm) | 405 | 10.0 |
| 3 | Polymer #2 of Table II | 265 | 6.0 |
| 3(a) | a. Polymer #2 (1500 ppm) b. Brine(1) c. Polymer #2 (1500 ppm) | 265 | 16.0 |

(1) Brine (Parts per Million)

| | |
|---|---|
| NaCl | 23,245 ppm |
| $MgSO_4 \cdot 7H_2O$ | 5,912 |
| $MgCl_2 \cdot 6H_2O$ | 4,552 |
| $CaCl_2$ | 1,167 |
| KCl | 620 |
| $NaHCO_3$ | 177 |
| KBr | 26 |
| $H_3BO_3$ | 22 |
| $SrCl_2 \cdot 6H_2O$ | 17 |
| $MnSO_4 \cdot H_2O$ | 3 |
| $Na_2H\,PO_4 \cdot 7H_2O$ | 3 |
| Water and Trace Compounds | |

TABLE II

| Partially Hydrolyzed Polyacrylamide (Polymers) | Molecular Weight | Degree of Hydrolysis (%) | Nitrogen Content (%) |
|---|---|---|---|
| Polymer #1 (Calgon WC-500) | $16 \times 10^6$ | 15 | 15 |
| Polymer #2 (Dow Pusher 1000) | $10 \times 10^6$ | 21 | 11.9 |

Calgon WC-500 is a polyacrylamide sold by Calgon Corp., Division of Merck and Co., Inc., Box 1346, Pittsburgh, Pa.
Dow Pusher 1000 is a polyacrylamide sold by Dow Chemical Co. of Midland, Mich.

TABLE III

| Cores | Treating Solution | Permeability To Air (m.d.) | Stabilized Residual Resistance Factor to Simulated Sea Water |
|---|---|---|---|
| 1 | Polymer #1 of Table II (1500 ppm) | 260 | 2.9 |
| 2 | a. Polymer #1 (1500 ppm) b. Brine with additional 39,000 ppm calcium | 280 | 16.9 |

TABLE III-continued

| Cores | Treating Solution | Permeability To Air (m.d.) | Stabilized Residual Resistance Factor to Simulated Sea Water |
|---|---|---|---|
| | ion (calcium acetate) added | | |
| | c. Polymer #1 (1500 ppm) | | |
| 3 | a. Polymer #1 (1500 ppm) | | |
| | b. Brine with additional 500 ppm aluminum ion (aluminum citrate) added | 220 | 18.0 |
| | c. Polymer #1 (1500 ppm) | | |

From the data as illustrated in Tables I and III, it can be seen that the stabilized residual resistance factor for brine after the test cores had been treated with a single polymer solution slug was from 2.7 to 6.2 times as large as it was when polymer treatment alone was used. After the single treatment of the cores with polymer solutions in accordance with this invention, brine was injected in and followed by a second slug of polymer solution. The results as illustrated by 2(a) and 3(a) of Table I achieved through the three-step method of the invention fully demonstrate the advantage of the invention. After the three-step treatment, brine again was injected and a new stabilized residual resistance factor was established which was 3.4 and 2.7 respectively times the stabilized residual resistance factor as shown in Table I, runs 2 and 3. The stabilized residual resistance factor to brine is increased by a factor in excess of 2.5 by injecting two slugs of polyacrylamide solution separated by a slug of brine over the use of a single slug of the polyacrylamide solution. The results of Table III demonstrate that the residual resistance factor for core 2 was 5.8 times as large when the calcium ion concentration is raised to 39,000 ppm by adding calcium acetate to the brine slug placed between the two polymer slugs as it was when polymer solution alone was used. The residual resistance factor for core 3 becomes 6.2 times as large when aluminum ion concentration is raised from about 1 ppm in the simulated sea water to 500 ppm by adding aluminum citrate to the brine slug placed between the two polymer slugs as when polymer solution alone is used. The permeability to brine has been illustrated to be reduced and the technique of this invention has application in water injection wells as well as in production wells resulting in reduced water-oil ratio.

Figure 1:
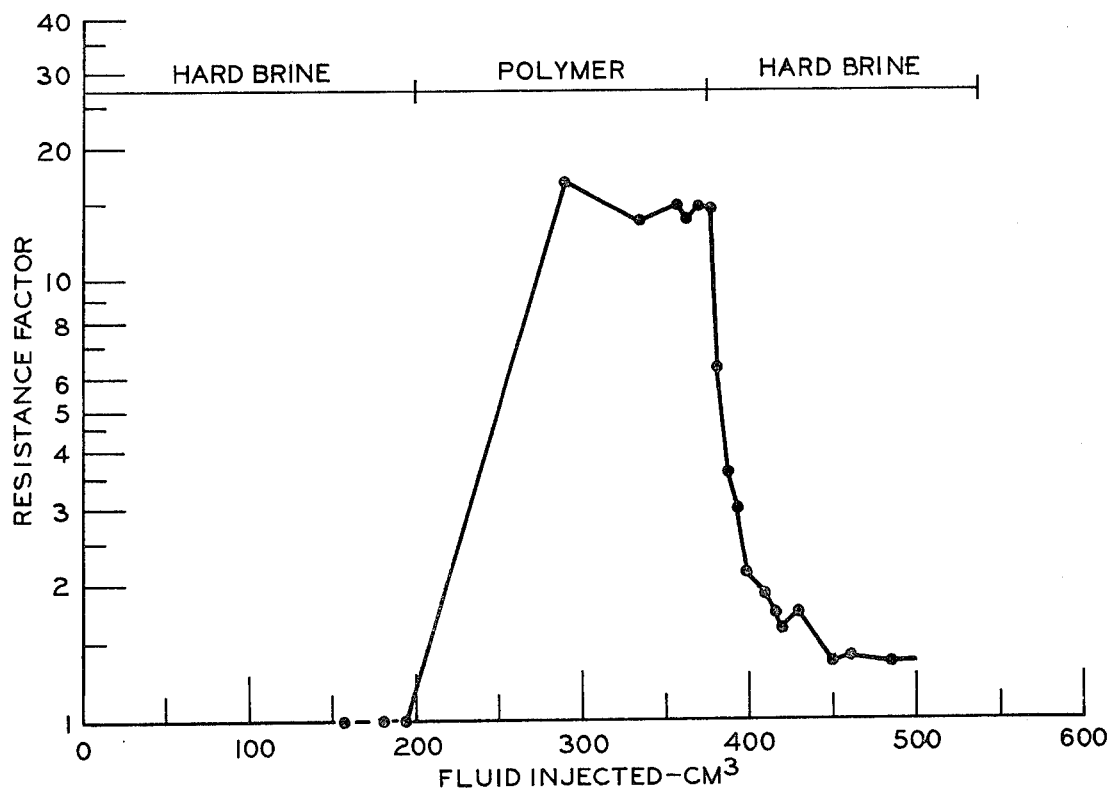
FIGS. 1–3 are graphs illustrating the benefits obtained by certain embodiments of the invention disclosed herein.

The plots found in FIGS. 1–3 involve Darcy's linear flow equation which can be stated as $K A \Delta P = Q u L$. This equation can also be expressed in the form $K/\mu = QL/A\Delta P$, wherein $K/\mu$ defines mobility. Since A equals the cross sectional area of the core and L the length of the core, they are constants for any core; therefore only $Q$ and $\Delta P$ are needed to determine the mobility. $\Delta P$ is the differential pressure across the core and $Q$ is the flow rate in cc per second. Permeability is represented by $K$ and is measured in millidarcy units while $\mu$ represents viscosity and is measured in centipoise units. Mobility ($K/\mu$) is therefore a function of permeability and viscosity which is measured in millidarcys (m.d.) and centipoise (cp); ($K/\mu$ = m.d./c.p.).

As shown in the attached FIGURES 2 and 3, high residual resistance factors were obtained by the use of a first aqueous solution (19% hydrolyzed polyacrylamide) and a second aqueous solution (11% hydrolyzed polyacrylamide) with the two polymer slugs being separated by a brine spacer slug which contained approximately 14,200 ppm of calcium and magnesium cations.

FIG. 1 illustrates the residual resistance factors achieved by using a single aqueous solution of partially hydrolyzed polyacrylamide. FIGS. 2 and 3 fully illustrate the marked improvement of mobility control of the first polymer solution and the second polymer solution applications as compared to a single application of a polymer solution. The tests were run in Archer County, Tex. (4350 ft. sand) cores with a 3,000 ppm polymer concentration in each slug. The first aqueous solution was mixed in a synthetic fresh water (approximately 4,000 ppm total dissolved solids), and the second polymer was mixed in an aqueous solution of synthetic hard brine (about 170,000 ppm total dissolved solids). As shown in the attached FIGURES, further brine flooding after application of the method of this invention did not effectively reduce the resistance factor as was the case with a single polymer solution.

FIG. 1 illustrates that a resistance factor of about 14 is obtained with a 11% hydrolyzed polyacrylamide in a hard brine solution. The results shown in FIG. 1 are similar to those obtained when using 19% hydrolyzed polyacrylamide mixed in fresh water as shown in the first portion of the curve of FIG. 2. The relatively low residual resistance factor obtained with either polymer (1.3 as shown in FIG. 1 and 2.1 as shown in FIG. 2) does not indicate a very lasting flow resistance even though permeability reduction was obtained in both cases. While conducting these core flooding tests, the successive use of a first hydrolyzed polyacrylamide and a second hydrolyzed polyacrylamide in the same core was discovered to yield relatively high residual resistance factors. The method of this invention resulted in retention of a resistance factor of about 12 even after injection of 28 pore volumes of following brine as shown in FIG. 2. This effect was confirmed by duplicate tests in a different Strawn core.

FIG. 3 illustrates a similar run with the residual resistance factor remaining at about 28 during brine injection after treatment.

The unexpectedly good mobility control obtained by treating a formation with an aqueous solution of a polyacrylamide with a relatively high degree of hydrolysis, then a brine solution, and then an aqueous solution of polyacrylamide with a relatively low degree of hydrolysis can be further enhanced under subterranean formation conditions by introducing into the brine spacer slug metal salts which can provide multivalent cations. Compounds which can provide divalent cations such as $Mg++$ and $Ca++$ provide some cross-linking of the polyacrylamides and thus added water diversion effects will result from the viscosity increase of the polymer solution. Compounds which provide even more effective cations such as $Al+++$, $Fe+++$, $Cr+++$, or other trivalent or polyvalent cations can be used.

From the foregoing description, it should be apparent that a new technique for reducing subterranean formation permeability to brine flow has been developed. Further, improved fluid injection patterns and subterranean formations are achieved through the use of the method disclosed hereinabove. While particular embodiments of the invention have been described, it will be understood that the invention is not limited thereto since many modifications can be made, and it is intended to include within the invention any such modifications as fall within the scope of the claims.

We claim:

1. In the method of treating a subsurface oil and water-producing interval of a formation located adjacent to a well bore to decrease the volume ratio of water to oil produced therefrom wherein an aqueous solution of a partially hydrolyzed polyacrylamide, said solution being substantially free of a crosslinking agent for said polyacrylamide, is injected into the producing formation and then producing fluids from said formation, the improvement which comprises:

crosslinking the polymer after it is introduced into the formation and prior to producing fluids from the treated formation by contacting said polymer with an aqueous solution containing a water soluble salt of a di or trivalent metal cation or an organic crosslinking agent.

2. The method of claim 1 wherein an aqueous solution containing polyvalent crosslinking metal cations dissolved therein is injected into the polymer treated formation to crosslink said polymer in said formation.

3. The method of claim 2 wherein the polyvalent metal cation is aluminum.

4. The method of claim 1 wherein the crosslinking solution is injected into the interval of the formation prior to the injection of said polymer solution.

5. The method of claim 1 wherein the polymer solution contains from 0.01 to about 0.75 percent by weight of polyacrylamide.

6. The method of claim 5 wherein the molecular weight of the polyacrylamide is at least about 500,000 and from about 0.1 to about 70 percent of the amide groups are hydrolyzed to carboxylate groups.

7. In the method of treating a subsurface oil and a water-producing interval of a formation located adjacent to a well bore to decrease the volume ratio of water to oil produced therefrom, wherein an aqueous solution of a partially hydrolyzed polyacrylamide, said solution being substantially free of a crosslinking agent for said polyacrylamide, is injected into the producing formation and then producing fluids from said formation, the improvement which comprises:

a. providing from about 0.01 to about 0.75 percent by weight of polyacrylamide in said aqueous solution wherein said polyacrylamide has a molecular weight of at least about 500,000 and from about 0.1 to about 70 percent of the amide groups are hydrolyzed to carboxylate groups, and b. crosslinking the polyacrylamide after it is introduced into the formation and prior to producing fluids from the treated formation by contacting the polyacrylamide with an aqueous solution of aluminum sulfate.

* * * * *